UNITED STATES PATENT OFFICE.

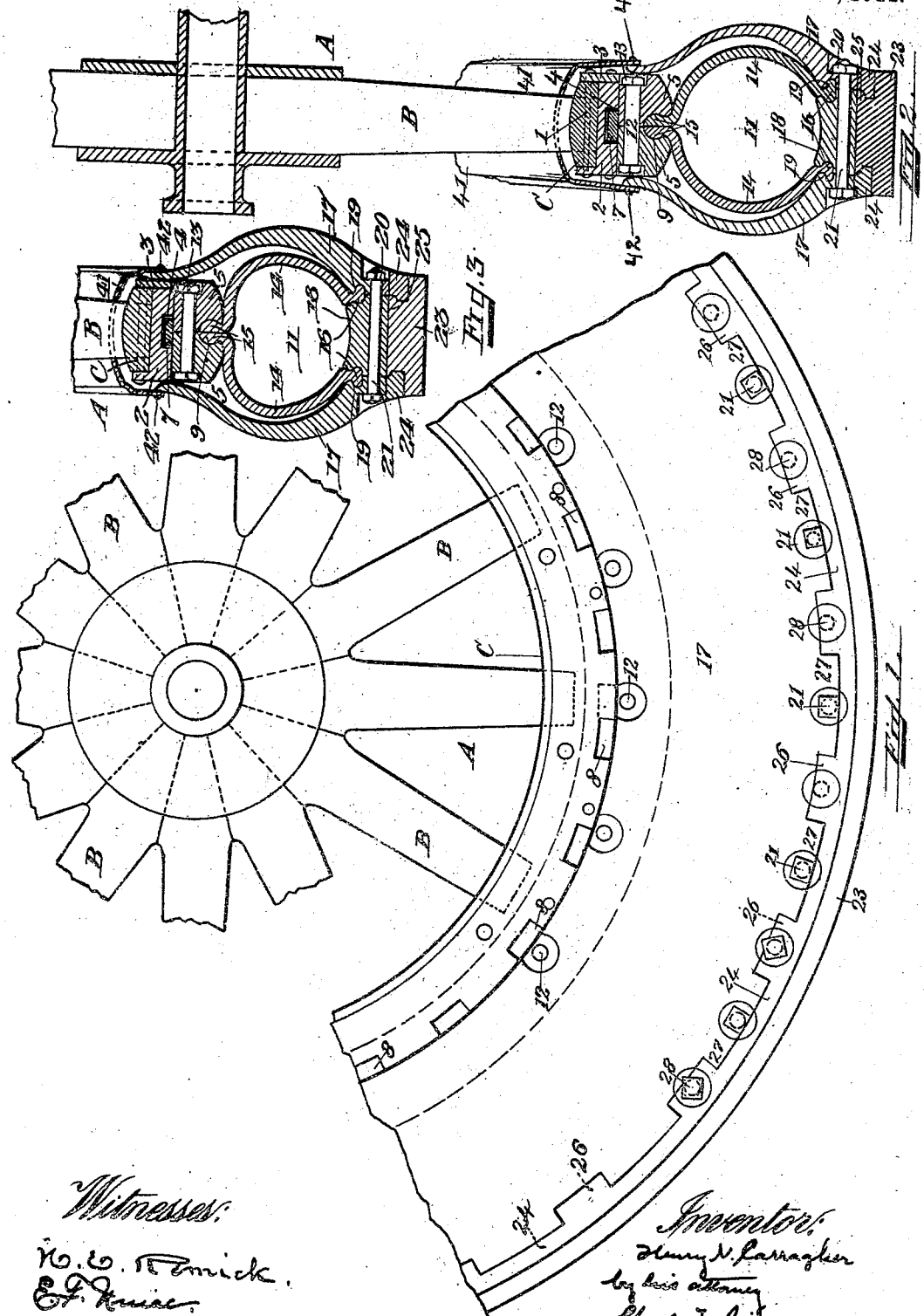

HENRY N. CARRAGHER, OF FALL RIVER, MASSACHUSETTS.

PNEUMATIC TIRE FOR WHEELS.

1,007,064.           Specification of Letters Patent.     Patented Oct. 31, 1911.

Application filed February 15, 1910. Serial No. 544,001.

*To all whom it may concern:*

Be it known that I, HENRY N. CARRAGHER, a citizen of the United States, residing at Fall River, in the county of Bristol and State of Massachusetts, have invented certain new and useful Improvements Relating to Pneumatic Tires for Wheels, of which the following is a specification, reference being had therein to the accompanying drawings.

The principal objects of the invention are: first, to provide means for reducing to a minimum the force of shock resulting from the wheels, say, of an automobile, contacting obstacles in the roadway, and from other causes; and I attain this object by arranging between the rim of the wheel and the protecting tread, an air cushion which is free to expand sidewise, that is, at right angles to the longitudinal axis of the air cushion. To permit this expansion, and yet operatively to secure the rim of the wheel and the tread together in the same plane, the tread is provided with a trough, the sides of which overlap the sides of the rim, but are sufficiently far apart not to interfere with the transverse expansion of the air cushion. In this way, the thrust of the wheel against the air cushion between the rim and the tread of the wheel, may, by compression, be distributed through an arc of, say, 180 degrees of the length of the air cushion. Second: to prevent cracking or crushing of the air cushion. And I attain this object by a further feature of my invention, which resides in the form given to so much of the surfaces of the trough and the rim of the wheel as come into contact with the air cushion, and tend to effect a change in the cross sectional area of the air cushion. If these surfaces are such as to cause the air cushion to assume an angular, as distinguished from a curved, cross sectional contour, the cushion is likely to crack along lines containing the contour angles. Now it is my purpose to avoid, as much as possible, the production of these cracks; and I do so by giving to these surfaces such cross sectional areas that the corresponding surfaces of the air cushion will always assume suitable curves; that is, during the oscillating movements of the wheel rim, these surfaces will compel the flexible sides of the air cushion to roll upon these surfaces in predetermined curves, which are not sharp enough to affect the elasticity and flexibility of the material of the air cushion; in other words, the tendencies to crack or crush the air cushion are reduced to a minimum. Third: to provide a tread, an air cushion, and a trough therefor, that can be combined to form one element, and be removably secured to the rim of a wheel. Fourth: to provide means for securing the air cushion in a fixed relation to the rim of the wheel. Fifth: to provide an air cushion having a non-puncturable wall portion. Sixth: to provide new and useful details of construction whereby the above mentioned objects, and also others as will hereinafter appear, can be readily attained.

In the drawings, illustrating the principles of my invention and the best mode now known to me for embodying the same, Figure 1 is an elevation of so much of an automobile wheel as will sufficiently disclose my invention. Fig. 2 is a transverse section of the wheel; Fig. 3 is like Fig. 2, except the air cushion is shown expanded transversely, the tread having been forced toward the rim of the wheel.

A wheel A, provided with spokes B, has a felly C. To the latter by means of a bolt 1, Fig. 2, is bolted a metal rim, in two parts 2, 3, having a series of intermittent grooves 4, 4, Figs. 2 and 3, in its outer circumference. On this metal or main rim 2, is fitted an auxiliary metal rim of two like parts 5, 5, having on their inner circumferential faces, bosses or studs 7, 7, to fit and be locked into the series of intermittent grooves 4, 4, in the main rim. These grooves are accessible from the sides of the main rim by side openings 8, Fig. 1, through which, in mounting the auxiliary rim, the bosses may be moved into the plane of the intermittent grooves in the main rim of the wheel. This method of securing the auxiliary metal rim to the main rim is more fully disclosed and claimed in an application for United States Letters Patent for locking devices for detachably securing a rim to the felly of a wheel, Serial No. 615,723, filed by me March 20, 1911.

Symmetrically cut in the outer adjacent surfaces of the like parts 5, 5, of the auxiliary rim is a common locking slot 9, into which a lock portion of an air cushion 11 may be inserted, and then gripped between the sides of the slot 9 by tightening bolts 12 and nuts 13, said bolts passing through the said members 5, 5, at suitable distances apart.

The air cushion 11, the two separate sides 14, 14, of which are made of leather, rubber or other suitable flexible material having the required strength, is of such a shape that when in normal position, its dimension of breadth is greater than that of its depth. The lock portion of the air cushion comprises two adjacent lips 15, 15, which, when in contact with each other, conform in cross section to, but are slightly larger than, that of the locking slot 9 in the auxiliary rim. When these lips 15, 15, are in the lock slot, and the nuts 13 on the bolts 12 are turned up, they become centrally secured in the convex face of the auxiliary rim; and, at the same time an air tight joint at their junction is formed throughout the length of the air cushion. To complete the air cushion, the sides 14, 14, also have similar lips 16, 16, fastened to the inside bottom portion of a non-puncturable metal trough or shield comprising two metal sides 17, 17, and a base 18. In the adjacent faces of the base 18, and each side 14 of the trough, is formed a locking slot 19, to seize and hold the corresponding lip 16 on the other edge of each of the two sides 14, 14, of the flexible air cushion 11. The metal sides 17, 17, of the shield are fastened to the sides of the base 18; and the lips 16, 16, of the flexible sides 14, 14, are securely gripped in the lock slots 19; by turning up nuts 20 on bolts 21 passing through the sides of the base. The base, in conjunction with the flexible sides, thus completes the air cushion, and provides its outer circumference with a non-puncturable wall.

The sides 17, 17, of the trough or shield flare outwardly and upwardly from the base, and then approach each other and engage the auxiliary rim. The trough thus serves to guide the oscillating wheel rim; to aid in the formation of the air cushion; and to protect the air cushion all of which is inclosed by the metal trough.

A tread 23 of suitable material, say hard rubber or leather, is provided and held on the outside of the base 18, by a metal ring 24 on either side of the base 18; there being a tongue on the inside of the tread which dovetails into a corresponding space formed by the outside of the base 18 and the sides of the retaining rings 24. The inside circumference of each ring 24 is provided with serrations 26, Fig. 1, which interlock with corresponding serrations 27, formed in the outside surface of the sides 17 of the shield or trough. Every other serration of each side of the shield, permits the nut 20 and its bolt 21 to bind the sides and the base together, while every other serration 26 in the ring 24 is provided with a bolt 28 and nut 29, the bolt passing through the rings 24 and the base 18, so that when the nuts are turned up on the bolts, the rings firmly fix the metal tread to the base of the wheel. By this construction, viz. by removing the rings, the tread may be taken off and restored, or a new one put on, without interfering with the assembled auxiliary rim, air cushion, and trough, all of which remain as a unit.

To exclude gravel and water from the interior of the trough, a covering 41 of waterproof material closely fits around the spokes of the wheel and loosely covers the outside of the felly and extends out and over the inner edges of the shield adjacent to the auxiliary rim and the felly, where it is secured as by screws 42.

From the above description, and an inspection, particularly, of Figs. 2 and 3, it will be evident, that the sides of the trough, being rigid and contacting the auxiliary rim, will always hold the base of the trough, and the tread in the plane of the wheel; that the form of the sides of the trough and the form of the air cushion and the method of securing the cushion within the sides of the trough, are such that the air cushion is free to expand transversely without interference with the sides of the trough; and, further, that by reason of the fact that the inner surface of the auxiliary rim is convex in cross section, and the air cushion is centrally disposed and secured in relation to the convex contacting surface of the auxiliary rim, the thrusts due from the oscillations of the auxiliary rim in relation to the base of the trough, or to the tread of the wheel, are freely resisted and absorbed by one half, that is 180 degrees, of the circumference of the air cushion, and the flexible sides of the air cushion roll back and forth on the convex surfaces of the auxiliary rim, to an extent depending upon the extent of said oscillations; but it will be noticed that the normal curvature of the cushion, and the convexity of the auxiliary rim are such that the convexity of the auxiliary rim prevents the contacting surface of the air cushion from assuming an angle that would tend to crack the sides of the cushion.

The air cushion may be inflated through a suitable inflation tube, not illustrated.

Desiring therefore, to protect my invention in the broadest manner legally possible, what I claim is:—

1. A trough for an air cushion, comprising a base portion and two side portions; bolts and nuts to secure said side portions to said base portion, said sides having their bottom portions serrated; said trough constituting a unit; a tread, tongue shaped in cross section and removably mounted on the outer circumference of the base of the trough; two retaining rings having serrations corresponding to the serrations in the sides of the trough, said rings engaging the tongue portion of the tread; bolts passing through the alternate serrations of the rings and the base of the trough, to secure the rings in place; all designed to permit the tread to be removed from the trough unit without dismantling said trough unit.

2. A wheel felly having a rib mounted on its outer circumferential surface; said rib consisting of two adjacent ring portions having centrally and circumferentially formed in the outer surface thereof a lock slot, from the outer side of which the surfaces of said rib recede outwardly and rearwardly toward the axis of the wheel; an air cushion having two strips of suitable elastic material, two of the four edge or lip portions of which are gripped between the sides of said lock slot, so as to hold the air cushion in proper relations with the inner contacting surface of the wheel felly, and, at the same time, form an air tight joint at and between the lips; said air cushion extending transversely beyond the sides of the rib; a metallic trough comprising a base portion, and two side portions that engage the wheel felly; there being formed in the adjacent surfaces of each side portion and the base portion a common slot; the other two edge or lip portions of the air cushion fitting into and being engaged by the sides of said two lock slots; means to secure said side portions to said base and compress said lips or edges in said lock slots, to form between the contacting surfaces of said base and said edges or lips of the air cushion, an air tight joint; said side portions extending outwardly and upwardly from the base in such a manner, that the sides of the air cushion are free to expand transversely, the convex surface of the rib and the convex surface of the air cushion being substantially tangential; all designed to prevent cracking and puncturing of the air cushion.

3. A wheel provided with spokes; a continuous strip of non-metallic flexible waterproof material provided with spoke-holes in water tight engagement with the outer end portions of said spokes; a wheel rim affixed to the end portions of said spokes; a trough comprising a base and two side pieces engaging the sides of the rim; an air cushion located between the face of the wheel rim and the base of the trough; and means for securing the edges of the waterproof strip or covering to the sides of the trough for the purpose of excluding gravel and water from the interior of the trough; the side portions of the said covering being sufficiently full to permit the said rim to oscillate in relation to the tread of the wheel without destroying the said covering.

4. A trough, having an air cushion, comprising a base portion and two side portions; a tread tongue-shaped in cross-section and removably mounted on the outer circumference of the base of said trough; two retaining rings that interlock with said trough and engage the sides of the tongue shaped tread for the purpose of retaining the said tread upon the outer circumference of the base of the trough; and means to secure said rings in place on the base of the trough; all designed to permit the tread to be freely mounted upon, and removed from, the base of the trough without dismembering the trough.

In testimony whereof I affix my signature in presence of two witnesses.

HENRY N. CARRAGHER.

Witnesses:
  FOSTER R. GREENE,
  LODWINE LEMOINE.

---

Copies of this patent may be obtained for five cents each, by addressing the "Commissioner of Patents, Washington, D. C."